J. ARMSTRONG.

Feed-Water Heaters and Filters for Steam-Boilers.

No. 5,569. Reissued September 9, 1873.

Attest;

Joe S. Peyton

Battis De Long

Inventor;

James Armstrong by his Atty

Wm D. Balderson

AM. PHOTO-LITHOGRAPHIC Co. N.Y. (OSBORNE'S PROCESS)

UNITED STATES PATENT OFFICE.

JAMES ARMSTRONG, OF TOLEDO, OHIO.

IMPROVEMENT IN FEED-WATER HEATERS AND FILTERS FOR STEAM-BOILERS.

Specification forming part of Letters Patent No. 91,700, dated June 22, 1869; reissue No. 5,569, dated September 9, 1873; application filed March 13, 1873.

*To all whom it may concern:*

Be it known that I, JAMES ARMSTRONG, formerly of Bucyrus, Ohio, but now residing at Toledo, in said State, have invented certain Improvements in Feed-Water Heaters and Filters for Steam-Boilers, of which the following is a specification:

This invention relates to feed-water heaters of that class in which the feed-water flows over a series of shelves or pans in thin sheets, is heated by steam, filtered, and pumped into the boiler.

Letters Patent No. 81,971 were granted to me September 8, 1868, for a heater of this kind, in which the filtering-chamber constituted a separate vessel from the heater proper, although connected with it by a pipe.

The improvements herein claimed consist, first, in so constructing the filter-chamber that it shall form an extension of the heater-chamber, be attached directly thereto, and be separated therefrom by a single wall only, said wall being perforated by an opening large enough to afford access to the lower part of the heater-chamber through the filter-chamber; second, in combining with a heater-chamber and filter-chamber, constructed as above specified, a removable perforated diaphragm or shield, which prevents the passage of filtering material into the heater-chamber while permitting the feed-water to pass from the heater-chamber through the filter-chamber; third, in combining a heater-chamber and a filter-chamber, having a single perforated division-wall between them, a shield to cover the opening, and a removable head or cover, through which the shield may be removed and access had to the heater; fourth, in combining a heater-chamber, a filter-chamber forming a lateral extension thereof and divided from it by a single perforated wall, a hot-well, and a filter between the heater-chamber and hot-well; fifth, in combining with the heater-chamber a series of independent separable pans, alternately perforate and imperforate, and arranged one above the other, to admit of their being readily removed, cleansed, and replaced; sixth, in combining a series of pans arranged as above specified, a removable head to the heater, and a clamp-screw passing through the head to hold the pans in place.

Figure 1:
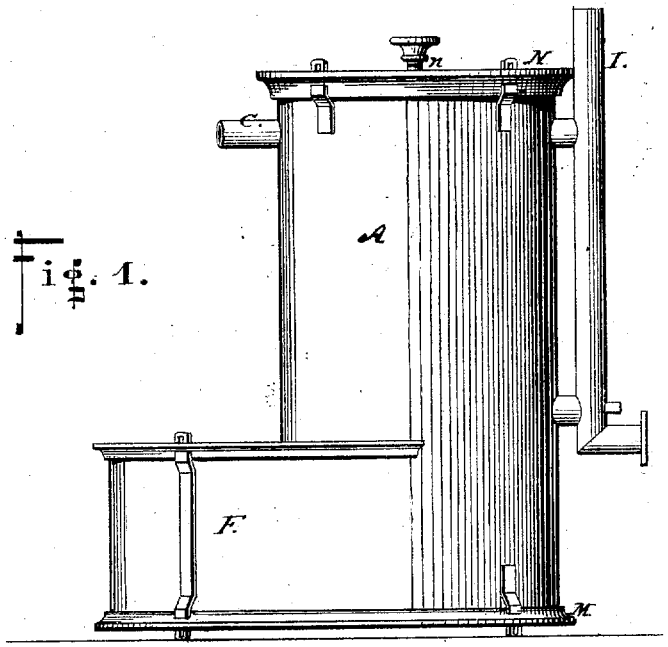
Figure 2:
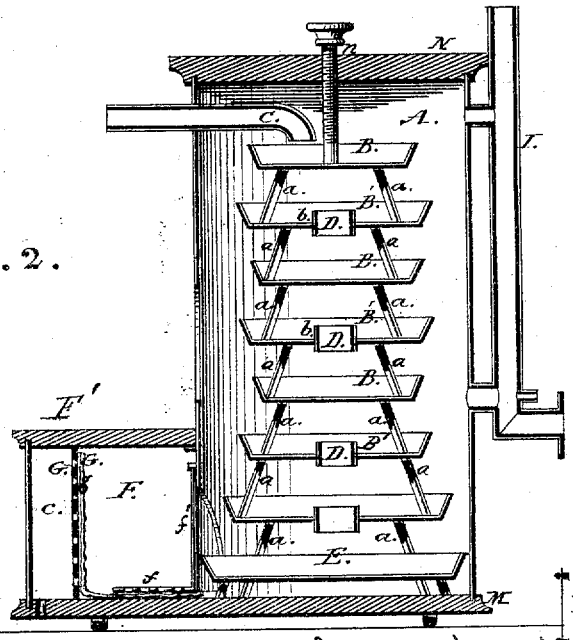

In the accompanying drawings, Figure 1 represents a side elevation of so much of my improved apparatus as is necessary to illustrate the invention claimed, and Fig. 2 a vertical section therethrough.

A cylindrical heater-chamber, A, is provided with a fixed bottom, M, and a removable head, N, the construction of which latter need not here be described, being shown in my Patent of 1868, above mentioned. A pipe, C, conducts the feed-water into the upper one of a series of pans, B B′, which are arranged vertically in the heater, the legs *a* of one pan resting on the bottom of the one below, and the entire series being clamped in position by a screw, *n*. The pans, being separable, may readily be removed from the heater by loosening the screw and removing the head N. The pans B, it will be observed, are of smaller diameter than the alternate ones B′, and have solid bottoms, while the others B′ are of greater diameter, and have each a central hole in them, in which is inserted a short pipe or collar, D, the upper edge of which is somewhat below the edge of the pan. The effect of this arrangement, which exists in the apparatus shown in my patent of 1868, above mentioned, is to cause the water to fill the pans, and alternately to overflow the edges of one set of pans and the central collar of the other set in thin sheets. A still larger pan, E, may be placed on the bottom of the heater, and a filter may be used therein, if deemed expedient.

A pipe, I, shown in my 1868 patent, above mentioned, supplies steam to the heater-chamber, as usual. The lime and sediment contained in the water are deposited partly in the pans and partly in the bottom of the heater-chamber, while the heated water passes through an opening in the shell of the heater-cylinder into a filtering-chamber, F, having a grating, *f*, a short distance above its bottom to allow room for sediment to settle.

The opening, it will be observed, between the heater and filter is closed by a partition, *f′*, above this grating. The bottom M of the heater projects beyond the heater-shell, and forms the bottom of the filtering-chamber, the shell of which is riveted or otherwise properly secured to the heater-shell, while its top is made removable.

The filter-chamber is divided into two compartments by a filter, which is composed of a perforated piece of wood or metal, G, and a piece of cloth or sponge, *g*, which is placed on the side of the perforated piece G next to the heater-chamber, as seen in Fig. 2. The water passes through this filter into the hot-well *c*, whence it is pumped into the boiler.

The filter-chamber, it will be observed, forms a lateral extension of the heater-chamber, to which its walls are riveted, and from which it is separated by a single wall, through which there is an opening large enough to admit the hand freely to afford access to the lower part of the heater. This opening is ordinarily covered by a shield or diaphragm, *f f*, perforated at its bottom for the passage of the feed-water, but which serves to keep filtering material from passing into the heater-chamber. The head F′ of the filter-chamber is made removable in order to afford access thereto; and, by removing the shield, access may be had to the heater-chamber without removing its head or disturbing the pans.

The operation of my heater will readily be understood from the foregoing description.

I do not broadly claim a filter separate from a heater-chamber, as that is shown in my patent of September 8, 1868.

In a feed-water heater and filter, I claim—

1. The filter-chamber, constructed as set forth, to form an extension of the heater-chamber, to which its walls are directly attached, and to leave an opening through which access may be had to the heater-chamber through the filter-chamber.

2. The combination of a heater-chamber, a filter-chamber, an opening of comparatively large area in the division-wall of the two chambers, and a removable perforated diaphragm or shield to close the opening while permitting the feed-water to pass through.

3. The combination of a heater-chamber, a filter-chamber, an opening in the partition-wall between the two, and a removable head or cover to the filter-chamber to afford access to the heater through the filter-chamber.

4. The combination of a heater-chamber, a filter-chamber, forming a lateral extension thereof, and separated from it by a single perforated wall, a hot-well, and a filter between the heater-chamber and hot-well.

5. The combination of the heater-chamber and its independent separable pans, arranged in series alternately perforate and imperforate, substantially as set forth.

6. The combination of the heater, the independent separable pans, the removable head, and the clamp-screw, substantially as set forth.

Witnesses: JAMES ARMSTRONG.
JOS. I. PEYTON,
E. C. DAVIDSON.